United States Patent
Miyauchi et al.

(10) Patent No.: US 7,716,828 B2
(45) Date of Patent: May 18, 2010

(54) METHOD OF MANUFACTURING THROTTLE BODY, AND THROTTLE BODY

(75) Inventors: Naoto Miyauchi, Obu (JP); Hiroshi Asanuma, Obu (JP); Mikiharu Yoshizaka, Obu (JP); Masashi Ozeki, Obu (JP)

(73) Assignee: Aisan Kogyo Kabushiki Kaisha, Obu-shi, Aichi (JP)

( * ) Notice: Subject to any disclaimer, the term of this patent is extended or adjusted under 35 U.S.C. 154(b) by 364 days.

(21) Appl. No.: 11/597,329

(22) PCT Filed: May 31, 2005

(86) PCT No.: PCT/JP2005/009969

§ 371 (c)(1), (2), (4) Date: Dec. 1, 2006

(87) PCT Pub. No.: WO2005/116421

PCT Pub. Date: Dec. 8, 2005

(65) Prior Publication Data

US 2007/0245561 A1 Oct. 25, 2007

(30) Foreign Application Priority Data

May 31, 2004 (JP) .............. 2004-161643

(51) Int. Cl.
*B21K 1/22* (2006.01)
*B21K 1/20* (2006.01)
*B29C 45/14* (2006.01)

(52) U.S. Cl. ............... 29/888.4; 29/888.45; 29/888.46; 29/527.1; 264/242; 264/279; 264/328.2; 123/337

(58) Field of Classification Search .............. 29/890.12, 29/890.124, 890.127, 888.4, 888.45, 888.46, 29/527.1; 264/328.2, 242, 279; 123/337
See application file for complete search history.

(56) References Cited

U.S. PATENT DOCUMENTS 6,626,421 B2 * 9/2003 Torii et al. .................. 251/305
6,901,942 B2 * 6/2005 Krimmer et al. ......... 137/15.25

FOREIGN PATENT DOCUMENTS

| DE | 10105526 | 8/2002 |
|---|---|---|
| JP | 62108669 | 7/1987 |
| JP | 8014032 | 1/1996 |
| JP | 10-205359 | 8/1998 |
| JP | 10-252460 | 9/1998 |
| JP | 10325471 | 12/1998 |
| JP | 11013496 | 1/1999 |
| JP | 11-294203 | 10/1999 |
| JP | 2001074156 | 3/2001 |
| JP | 2001-212846 | 8/2001 |
| JP | 2002021588 | 1/2002 |
| JP | 2002-138861 | 5/2002 |
| JP | 2002138869 | 5/2002 |
| JP | 2004092617 | 3/2004 |
| JP | 2005-155595 | 6/2005 |
| WO | 02/070881 | 9/2002 |

* cited by examiner

*Primary Examiner*—David P Bryant
*Assistant Examiner*—Sarang Afzali
(74) *Attorney, Agent, or Firm*—Dennison, Schultz & MacDonald

(57) ABSTRACT

A resin main body (3) defining a bore (7) through which intake air flows, and a valve body (60) having a shaft part (20) rotatably supported by the main body (3) and a valve part (4) for opening and closing the bore (7) of the main body (3) are provided. The main body (3) is molded with the valve body (60) inserted together with a pair of bearing sleeves (24). At the time of molding the main body (3), the bearing sleeves (24) are biased in a direction opposite to the flow of the intake air with the valve body (60) being positioned in place.

5 Claims, 15 Drawing Sheets

METHOD OF MANUFACTURING THROTTLE BODY, AND THROTTLE BODY

This application is a filing under 35 USC 371 of PCT/JP2005/009969, filed May 31, 2005.

TECHNICAL FIELD

The present invention relates to a method of manufacturing a throttle body for controlling an intake air amount of an internal combustion engine, and also relates to a throttle body.

BACKGROUND ART

A conventional throttle body is provided with a resin main body defining a bore through which intake air flows, a metal shaft part rotatably supported by the main body via a pair of metal bearing sleeves, and a valve body having a valve part for opening/closing the bore (for example, see Patent Document 1). The main body is molded with the valve body having the shaft part integrated with the valve body inserted, together with the pair of bearing sleeves.

Patent Document: JP 11-294203 A

DISCLOSURE OF THE INVENTION

Problem to be Solved by the Invention

In the above-mentioned ordinary conventional throttle body, as shown in FIG. 14, because of a bearing structure between a shaft part 820 and bearing sleeves 824, a backlash or a clearance Ca with respect to a radial direction exists between the shaft part 820 and the bearing sleeves 824. Here, the clearance Ca is a gap between the shaft part 820 and the bearing sleeves 824 disposed on a common axis La. Further, in general, the clearance Ca is, for example, approximately 10-300 μm.

Conventionally, when a main body 803 is molded with a valve member 860 having the shaft part 820 and a valve part 804 inserted together with the bearing sleeves 824, the bearing sleeves 824 are typically positioned on the common axis La.

In addition, a negative pressure of an intake air acts on the valve part 804 when the negative pressure has been applied in the state of actual use (called "actual use state") of a throttle body 802 (see FIG. 15).

Therefore, with the throttle body 802 configured as described above (see FIG. 15), at the time when the negative pressure of the intake air has been applied (called "at the negative pressure application") in the state of actual use (called "actual use state"), the negative pressure of the intake air applied to the valve part 804 forces the valve member 860 to be shifted toward the side of application of negative pressure or the downstream side (lower side as viewed in FIG. 14). Then, as shown in FIG. 15, sealing surfaces 815 at the outer peripheral end surface of the valve part 804 cannot seal against seal surfaces 816 of a bore wall of the main body 803 when the valve part 804 has been fully closed. Therefore, there has been a problem of increase in the amount of leakage of air at the fully closed position of the valve member. If the air leak amount at the fully closed position of the valve member is large, the idle rotation speed of the engine increases to lower the fuel economy. Therefore, it is desirable to reduce the air leak amount at the fully closed position in order to lower the idle rotation speed of the engine and to improve the fuel economy.

It is an object of the present invention to provide a method of manufacturing a throttle body, and a throttle body, which enables to reduce an air leakage amount when a valve body is fully closed.

Means for Solving the Problem

The above-mentioned problem can be solved by a method of manufacturing a throttle body, and a throttle body as defined in the appended claims.

That is, according to a first aspect of the invention, there is provided a method of manufacturing a throttle body including a resin main body defining a bore through which intake air flows, and a valve body having a shaft part rotatably supported by the main body via a pair of bearings, and a valve part for opening and closing the bore of the main body;

the method including molding the main body with the valve body inserted together with the pair of the bearings;

wherein, with the valve member positioned in place, the bearings are biased in a direction opposite to the flow of the intake air.

According to the first aspect of the invention, constructed as described above, the main body can be molded with the bearings contacting with the shaft part of the valve member in the direction opposite to the flow of the intake air. Therefore, the bearings can be integrated with the main body with the bearings accurately positioned in the direction opposite to the flow of the intake air by reference to the shaft part. Therefore, even if the negative pressure of the intake air has been applied to the valve member at the actual use state of the throttle body, the shaft part can be held in place by the bearings, so that it is possible to preclude the shift of the valve member toward the negative pressure side or the downstream side. As a result, it is possible to improve the sealing property of the valve member at the fully closed position against the bore of the main body and to reduce the air leak amount at the fully closed position of the valve member.

According to a second aspect of the invention, in the method of manufacturing the throttle body according to the first aspect of the invention, a resin molding pressure for molding the main body is used as the biasing force for biasing the bearings in the direction opposite to the flow of the intake air.

With the second aspect of the invention thus constituted, because the resin molding pressure for molding the main body is used as the biasing forces for biasing the bearings in the direction opposite to the flow of the intake air, it is possible to eliminate a special means for biasing the bearings.

According to a third aspect of the invention, in the method of manufacturing the throttle body according to the first aspect of the invention, biasing forces of bearing-presser spring members are used as biasing forces for biasing the bearings in the direction opposite to the flow of the intake air.

With the third aspect of the invention thus constituted, it is possible to suitably bias the bearings in the direction opposite to the flow of the intake air by using the biasing forces of the bearing holding springs.

According to a fourth aspect of the invention, a throttle body is provided manufactured by the method of manufacture according to any one of the first to third aspects of the inventions.

With the throttle body thus manufactured, it is possible to improve the sealing property of the valve member at the fully closed position against the bore of the main body and to reduce the air leak amount at the fully closed position of the valve member.

BEST MODE FOR CARRYING OUT THE INVENTION

Next, the best mode for carrying out the present invention will be described with reference to embodiments.

Embodiment 1

Figure 1:
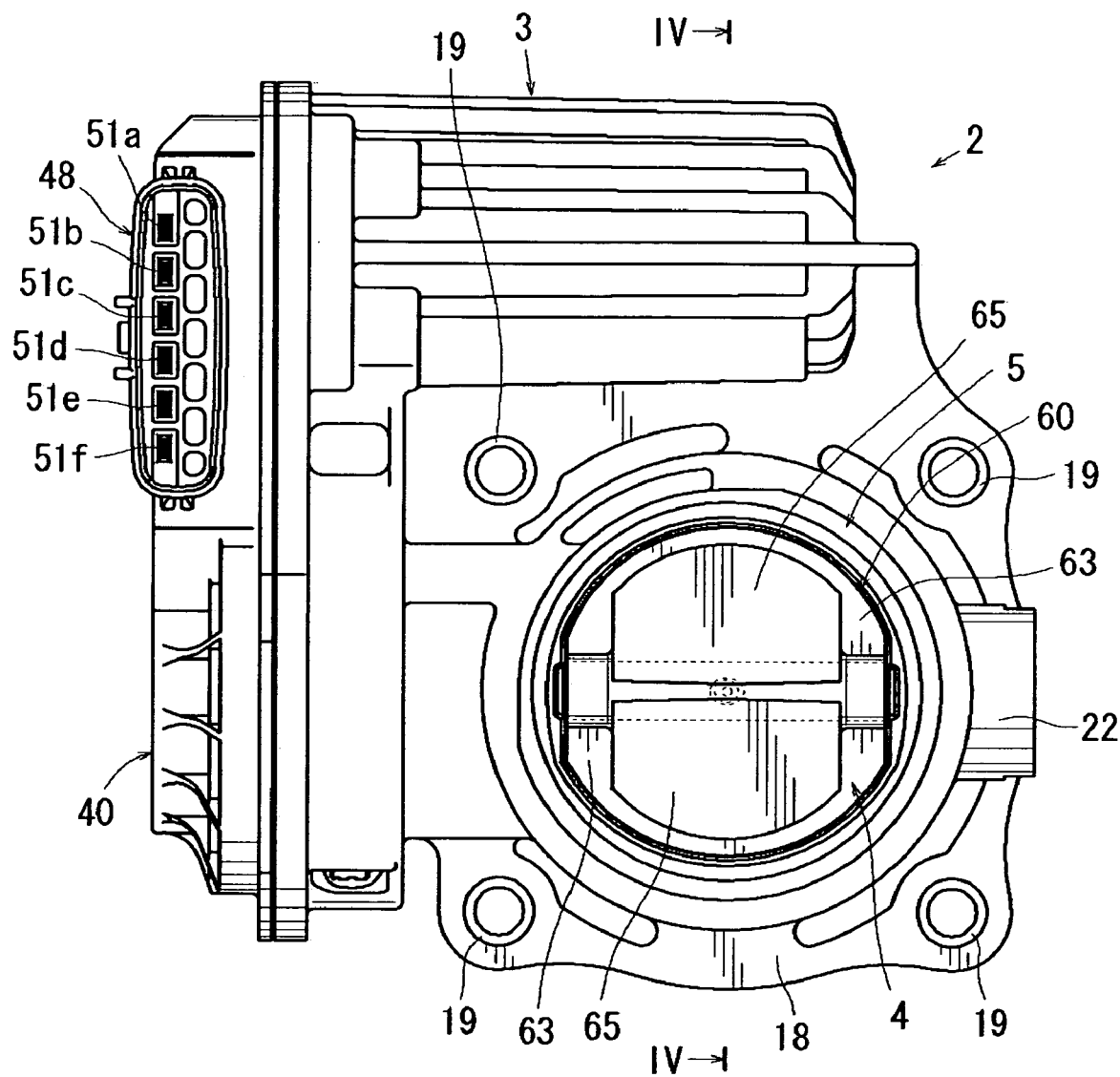
[FIG. 1] A front view of a throttle body according to Embodiment 1.

Embodiment 1 will be described. This embodiment is described in connection with a so-called electronic control type throttle body, in which the opening/closing of a valve body is controlled by a motor. FIG. 1 is a front view of the throttle body, FIG. 2 is a bottom view of the throttle body, FIG. 3 is a sectional view taken along the arrow line III-III in FIG. 2, FIG. 4 is a sectional view taken along the arrow line IV-IV in FIG. 1, FIG. 5 is left side view of a main body in the state where a cover body has been removed.

Figure 2:
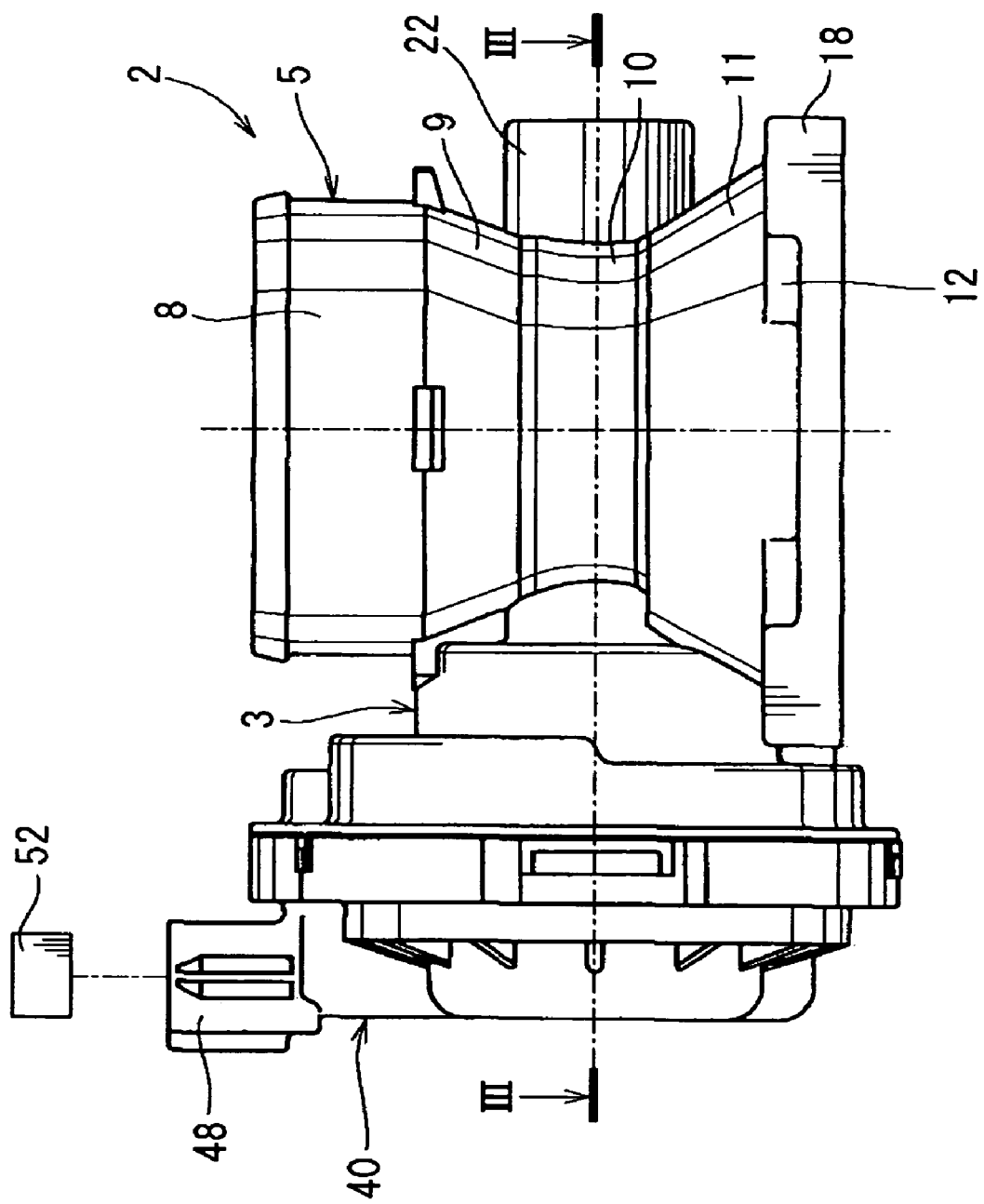
[FIG. 2] A bottom view of the throttle body.
Figure 3:
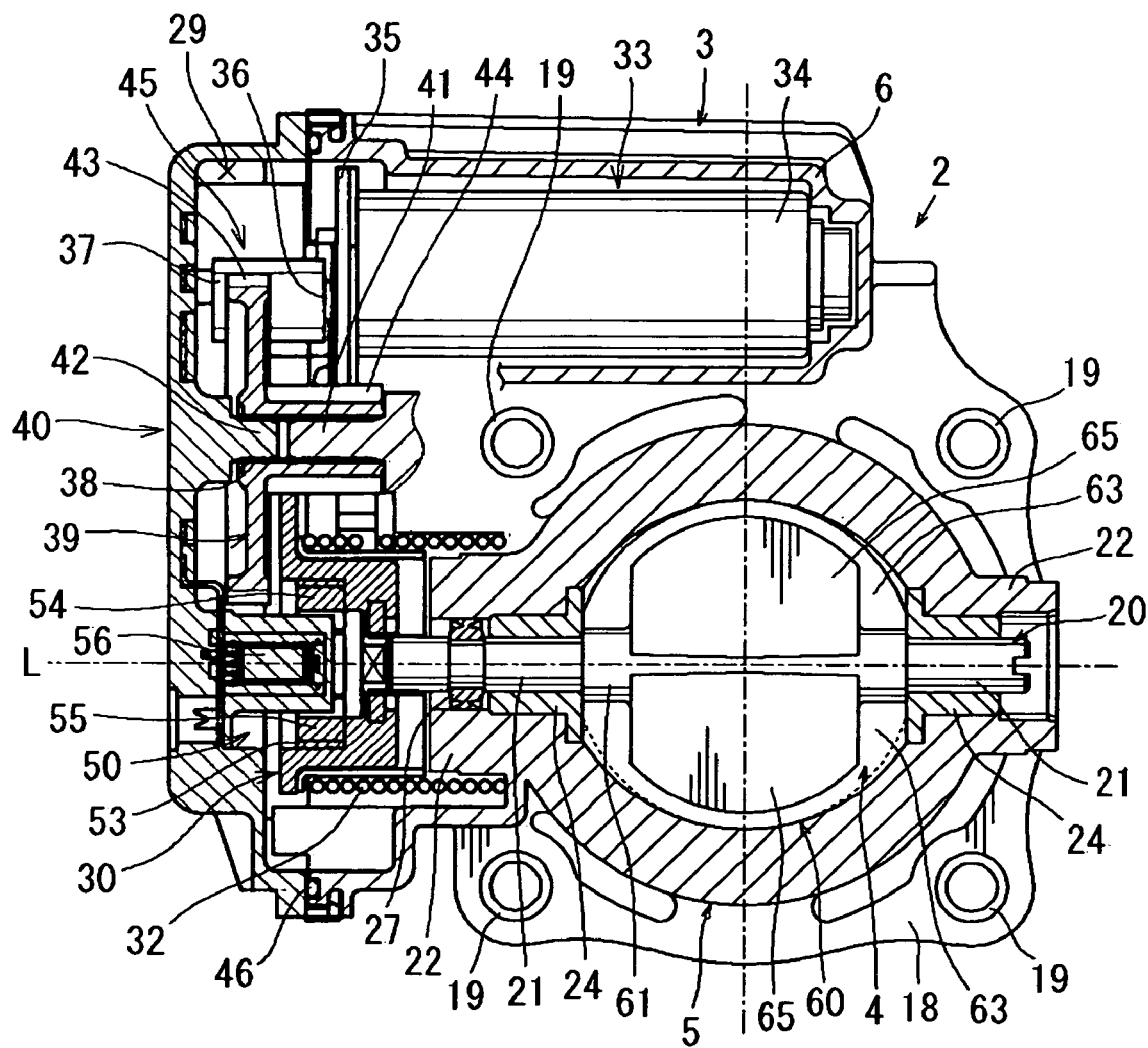
[FIG. 3] A sectional view taken along the arrow line III-III in FIG. 2.

As shown in FIG. 2, a throttle body 2 is provided with a resin main body 3 and a resin valve member 4 (see FIGS. 1 and 3). The main body 3 and the valve member 4 are both formed by injection molding processes.

Figure 4:
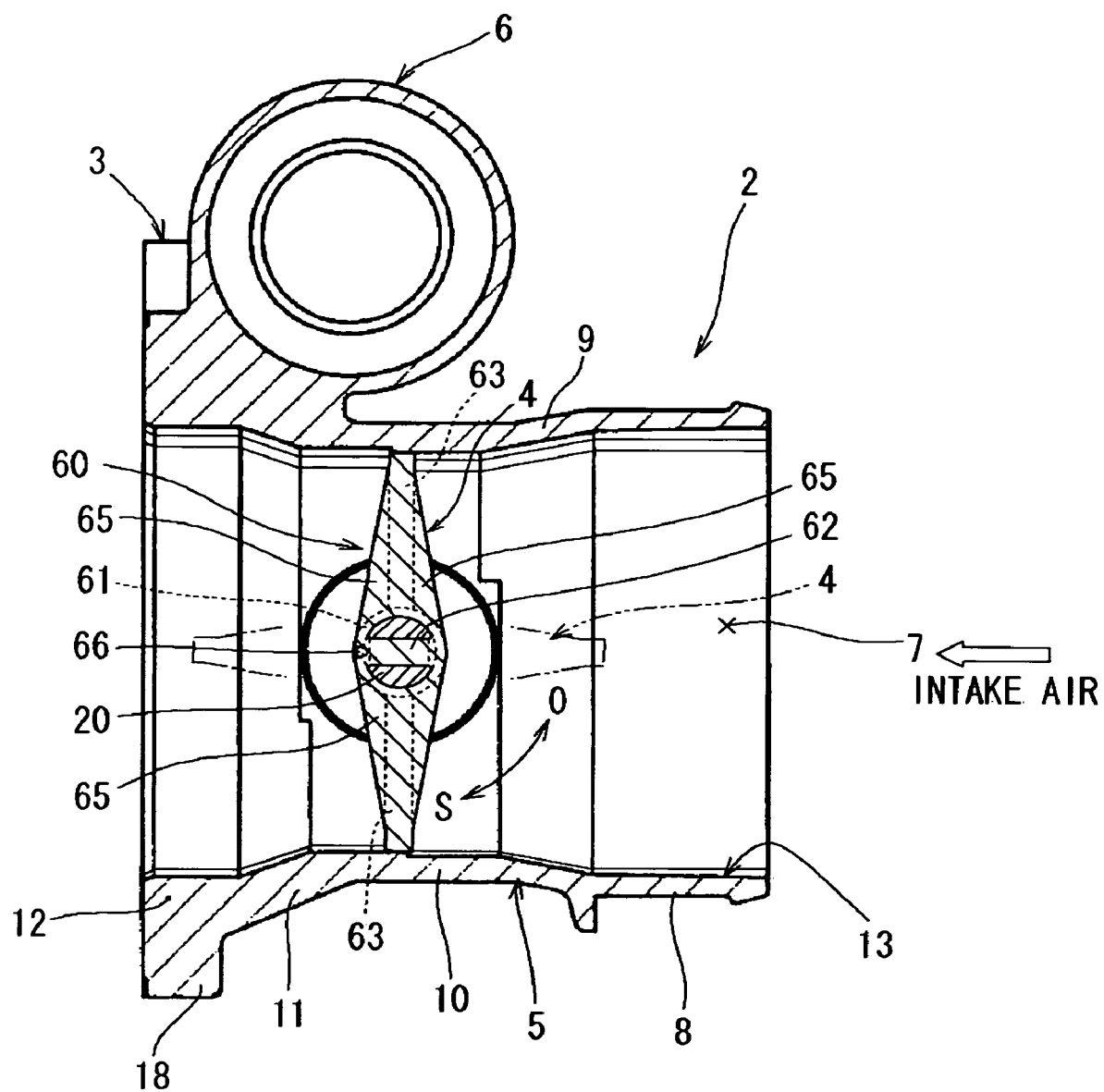
[FIG. 4] A sectional view taken along the arrow line IV-IV in FIG. 1.
Figure 5:
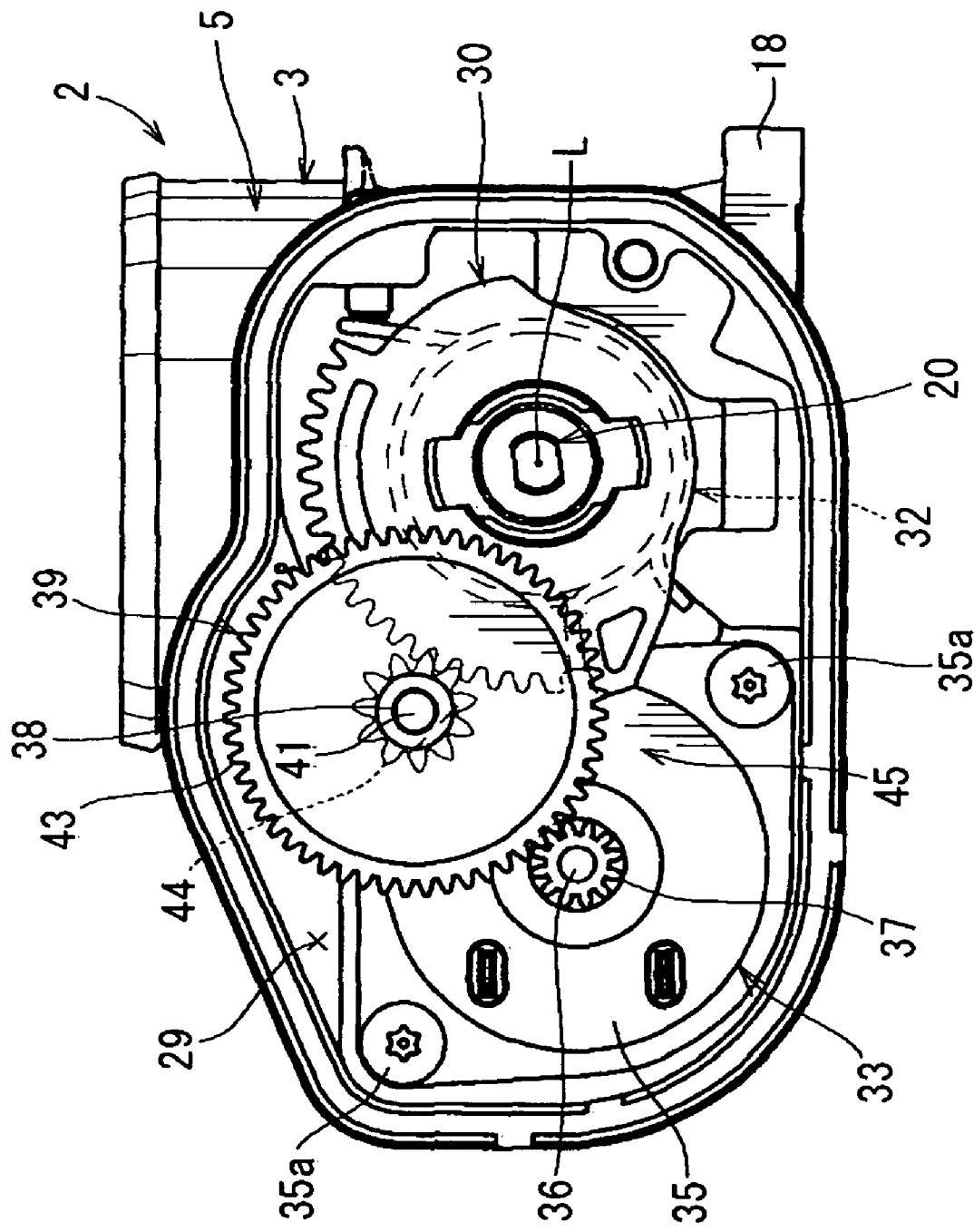
[FIG. 5] A left side view of a main body in the state where a cover body has been removed.

With the main body 3, a bore wall portion 5 and a motor housing portion 6 are integrally molded (see FIGS. 3 and 4).

The bore wall portion 5 is formed substantially as a hollow cylinder having a bore 7 extending in right and left directions therethrough as viewed in FIG. 4. The bore wall portion 5 has a straight cylindrical inlet-side tubular connecting portion 8 extending continuously from the right to the left in FIG. 4, a conical tubular portion 9 formed as a conical tube whose diameter is gradually decreased, a primary tubular portion 10 formed as a straight cylinder, an inverted conical tubular portion 11 formed as an inverted conical tube whose diameter gradually increases, and an outlet-side tubular connecting portion 12 formed as a straight cylinder. The inner wall surfaces of the tubular portions 8, 9, 10, 11, and 12 of the bore wall portion 5 will be generally referred to as "bore wall surface" (labeled with numeral 13).

On the inner peripheral surface of the primary tubular portion 10, an annular-strip-like sealing surface 16 is formed and is adapted to surface-to-surface contact with a sealing surface 15 at the outer peripheral end surface of the valve member 4 (hereinafter described) (see FIGS. 8 and 9). The sealing surfaces 15 of the valve member 4 will be referred to as "valve-side sealing surfaces", and the sealing surface 16 of the main body 3 will be referred to as "body-side sealing surface".

As shown in FIG. 2, a flange portion 18 for fastening protrudes substantially in a rectangular-plate-like fashion and is connected with the outer peripheral surface of the opening end portion on the side of the outlet-side tubular connecting portion 12 of the bore wall portion 5 (see FIG. 1). Metal bushes 19 are provided at four corners of the flange portion 18 for fastening (see FIG. 1). Fastening bolts (not shown) for fastening an intake manifold, which is arranged on the downstream side of the main body 3, to the flange portion 18 for fastening can be passed through the bushes 19.

An air cleaner (not shown) arranged on the upstream side of the main body 3 is fitted into the inlet-side tubular connecting portion 8 of the bore wall portion 5 for communication therewith. The intake manifold (not shown), which is arranged on the downstream side of the main body 3, is fastened to the flange portion 18 for fastening by fastening bolts/nuts for communication with the outlet-side tubular connecting portion 12 of the bore wall portion 5. In this way, communication is established between the bore wall portion 5 of the main body 3, the air cleaner, and the intake manifold, so that intake air from the air cleaner flows to the intake manifold through the bore 7 in the bore wall portion 5.

As shown in FIG. 3, a metal throttle shaft 20 is disposed in the bore wall portion 5 and extends radially across the bore 7 (in right and left directions in FIG. 3). Right and left support shaft portions 21 formed at both ends of the throttle shaft 20 are rotatably supported by a pair of right and left bearing sleeves 24 inserted into a pair of right and left bearing boss portions 22 formed integrally with the bore wall portion 5. The bearing sleeves 24 are formed of a pair of metal cylindrical bushes arranged symmetrically on the right and left sides. The outer peripheral portions of the bearing sleeves 24 are respectively surrounded by the bearing boss portions 22 and are placed in position with respect to the axial direction. The bearing sleeves 24 will be described in detail later.

In FIG. 3, the right end portion of the throttle shaft 20 is accommodated in the right-side bearing boss portion 22. The open end surface of the right-side bearing portion 22 is sealed by a plug (not shown).

The left end portion of the throttle shaft 20 extends through the left-side bearing boss portion 22 and protrudes leftward. A rubber sealing material 27 is fitted into the left-side bearing boss portion 22 from the opening side thereof (left-side side in FIG. 3). The inner peripheral portion of the sealing material 27 is slidably fitted into a circumferential annular groove (not labeled with reference numeral) formed in the outer peripheral surface of the throttle shaft 20. Due to the sealing material 27, air leakage from a gear housing space 29 (described below) into the bore 7, and air leakage from the bore 7 into the gear housing space 29 are prevented.

As shown in FIG. 4, the substantially disc-like valve member 4 is formed integrally with the throttle shaft 20 by an insert molding process. The valve member 4 rotates together with the throttle shaft 20 to open/close the bore 7 in the bore wall portion 5 in order to control the amount of intake air flowing through the bore 7. The solid line 4 indicates the closed state of the valve member 4. Rotating counterclockwise in FIG. 4 from the closed state (i.e., in direction of arrow O in FIG. 4), sets the valve member 4 to the open state (indicated by dash-double-dot lines 4 in FIG. 4). Rotating clockwise in FIG. 4 (i.e., in direction of arrow S in FIG. 4) from the open state sets the valve member 4 to the closed state (see solid line 4 in FIG. 4).

As shown in FIG. 3, a throttle gear 30 formed, for example, of a resin sector gear, is integrally provided at the left-side end portion of the throttle shaft 20, which protrudes from the left-side bearing boss portion 22 (see FIG. 5).

Further, between the throttle gear 30 and the side surface of the main body 3 facing the end surface of the throttle gear 30, a back spring 32 is provided to be positioned on the rotational axis L of the throttle shaft 20. The back spring 32 holds the throttle gear 30 constantly and resiliently in a position (hereinafter referred to as opener opening position) opened by a predetermined angle from the fully closed position.

As shown in FIG. 3, the motor housing portion 6 of the main body 3 is substantially formed as a bottomed cylinder parallel to the rotational axis L of the throttle shaft 20 and open to the left in FIG. 3. The drive motor 33 constituted, for example, by a DC drive motor is accommodated in the motor housing portion 6. A mounting flange 35 is provided on a motor housing 34 defining an outer contour of the drive motor 33 and is fixed to the main body 3 by fixing means (e.g., screws 35a) (see FIG. 5).

Further, a motor pinion 37 made, for example, of resin is integrally formed with the protruding end of a motor shaft 36, which protrudes to the left in FIG. 3 from the mounting flange 35 of the drive motor 33 (see FIG. 5).

As shown in FIG. 3, between the main body 3 and a cover body 40 closing the open end surface thereof (left-side open end surface in FIG. 3), a hollow counter shaft 38 is provided and extends parallel to the rotational axis L of the throttle shaft 20. The counter shaft 38 is, for example, a metal hollow cylinder and is fitted into and positioned between protruding shaft portions 41 and 42 respectively protruding from opposing end surfaces of the main body 3 and the cover body 40.

A counter gear 39 made, for example, of resin is rotatably supported by the counter shaft 38. As shown in FIG. 5, the counter gear 39 has a large diameter gear part 43 and a small diameter gear part 44 which are of different gear diameters. The large diameter gear part 43 is in mesh with the motor pinion 37, and the small diameter gear part 44 is in mesh with the throttle gear 30.

A reduction gear mechanism 45 is constituted by the throttle gear 30, the motor pinion 37, and the counter gear 39. The reduction gear mechanism 45 is accommodated in the gear housing space 29 formed between the main body 3 and the cover body 40 (see FIG. 3).

The cover body 40, which is made, for example, of resin, is coupled to one side surface (left-side surface in FIG. 3) of the main body 3. As a coupling means for coupling the main body 3 to the cover body 40, a snap-fit means, a clip means, thread fastening means and welding may be incorporated. An O-ring 46 may be interposed between the main body 3 and the cover body 40 for maintaining air-tight of the interior, if necessary.

As shown in FIG. 1, a connector portion 48 is formed integrally with the cover body 40. An external connector (not shown) is electrically connected to a control device 52, which will be described later (see FIG. 2), and can be connected to the connector portion 48. Terminals 51a to 51f are arranged in the connector portion 48. The terminals 51a to 51f are electrically connected to the drive motor 33 (see FIG. 3) and a throttle position sensor 50 described below (see FIG. 3).

The drive motor 33 (see FIG. 3) is drive-controlled by the control device 52, such as an engine control unit, or an ECU of an automobile (see FIG. 2), in response to an accelerator signal related to gas pedal depressing amount, a traction control signal, a constant-speed traveling signal, and an idle speed control signal.

The drive force of the motor shaft 36 of the drive motor 33 is transmitted from the motor pinion 37 to the throttle shaft 20 through the counter gear 39 and the throttle gear 30. This causes the valve member 4, which is integrated with the throttle shaft 20, to be rotated, with the result that the bore 7 is opened or closed.

As shown in FIG. 3, the throttle gear 30 is integrally provided with a ring-like yoke 53 made of a magnetic material and positioned coaxially with the rotational axis L of the throttle shaft 20. The inner peripheral surface of the yoke 53 is integrated with a pair of magnets 54 and 55 generating magnetic fields. The magnets 54 and 55 are formed, for example, of ferrite magnets, and are parallel-magnetized so that the magnetic lines of force generated between them, that is, the magnetic fields, are parallel to each other, generating substantially parallel magnetic fields in the space within the yoke 53.

On the inner side surface of the cover body 40, the throttle position sensor 50, which is a rotation angle sensor equipped with a sensor IC 56 with a built-in magnetoresistive element, is positioned. The throttle position sensor 50 is positioned on the rotational axis L of the throttle shaft 20 and between the magnets 54 and 55 at a predetermined interval. The sensor IC 56 of the throttle position sensor 50 computes the output from the magnetoresistive element and outputs an output signal corresponding to the direction of the magnetic field to the control device 52, so that it is possible to detect the direction of the magnetic field without depending on the intensity of the magnetic field.

With the above-mentioned throttle body 2 (see FIGS. 1 through 5), when the engine is started, the drive motor 33 is drive-controlled by the control device 52. As noted above, the valve member 4 is thereby opened/closed through the reduction gear mechanism 45, with the result that the amount of intake air flowing through the bore 7 of the main body 3 is controlled.

As the throttle shaft 20 rotates, the yoke 53 and the magnets 54 and 55 rotate together with the throttle gear 30, so that the direction of the magnetic field across the throttle position sensor 50 varies in response to the rotation angle, and the output signal of the sensor 50 varies. The control device 52 thereby calculates the rotation angle of the throttle shaft 20, that is, the throttle opening of the valve member 4, based on the output signal of the sensor IC 56.

The control device 52 (see FIG. 2) controls so-called control parameters, such as fuel injection control, correction control on the opening of the valve member 4, and automatic transmission control based on the throttle opening output from the sensor IC 56 of the throttle position sensor 50 (see FIG. 3) and detected according to the direction of the magnetic field as magnetic physical amount of the pair of magnets 54 and 55, vehicle speed detected by a vehicle speed sensor (not shown), engine RPM according to a crank angle sensor, and detection signals from sensors such as a gas pedal sensor, an $O_2$ sensor, and an air flow meter.

Figure 8:
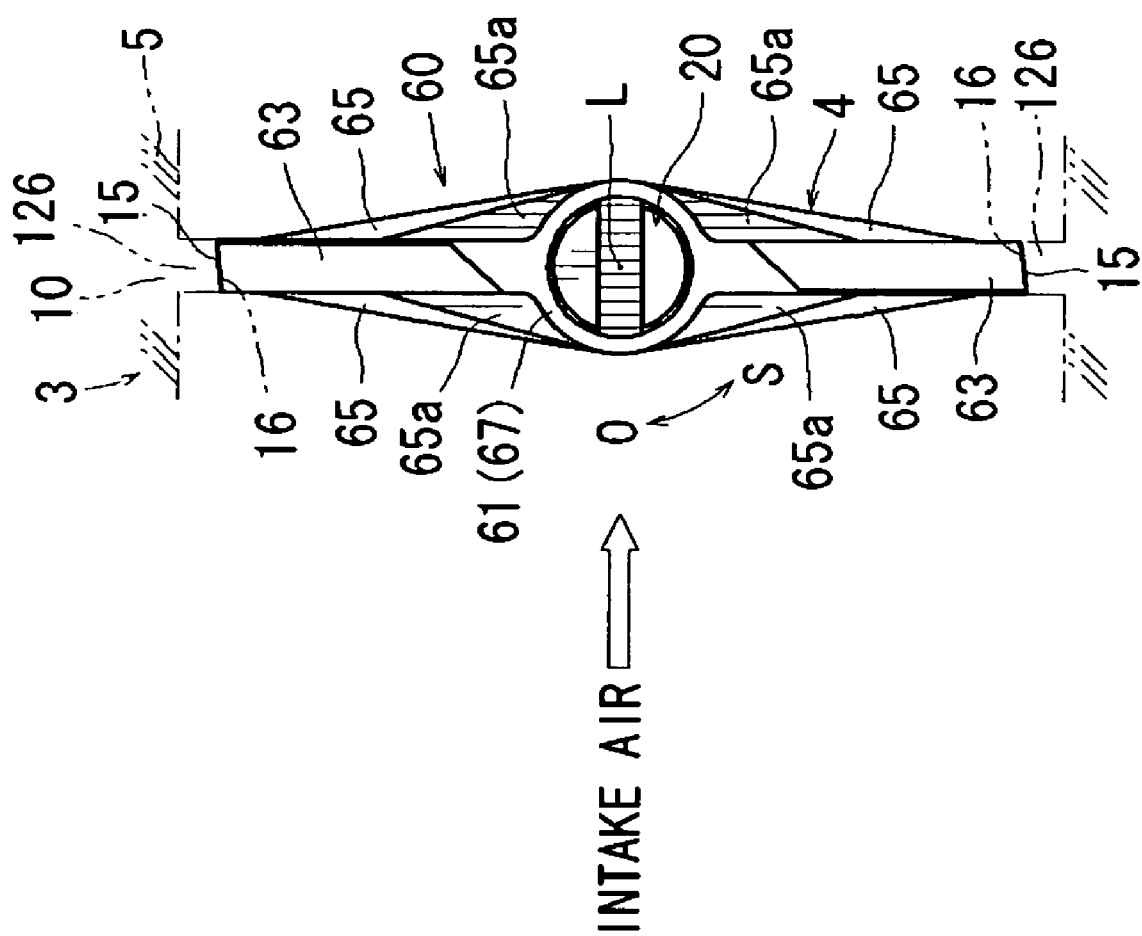
[FIG. 8] An end view as viewed in a direction of arrow line XIII in FIG. 7.
Figure 9:
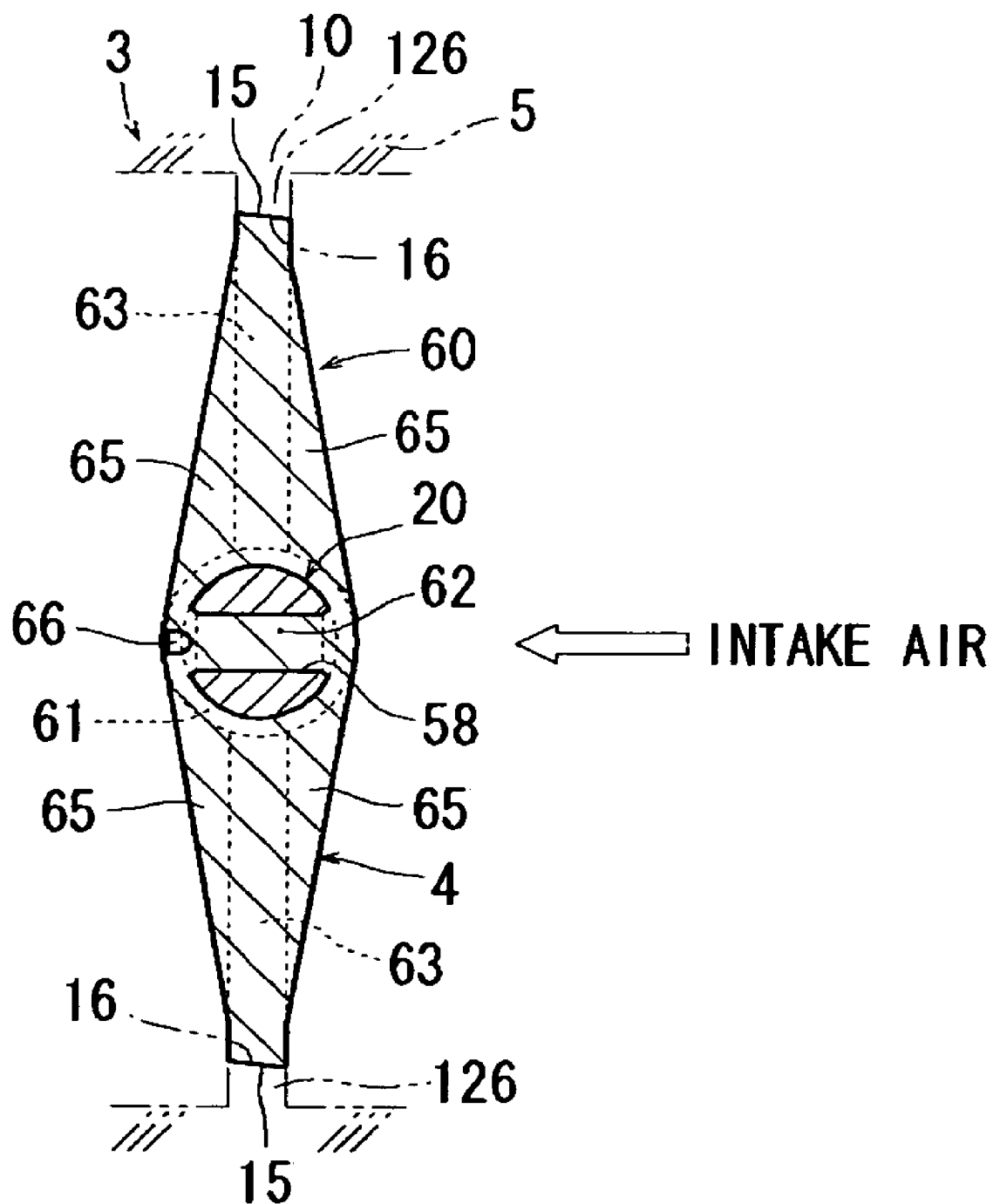
[FIG. 9] A sectional view taken along the arrow line IX-IX in FIG. 7.

As shown in FIG. 9, the resin of the valve member 4, integrally molded on the throttle shaft 20, surrounds the periphery of the throttle shaft 20. At the center of the throttle shaft 20 corresponding to the center of the valve member 4, a through-hole 58 is formed to extend radially, and the resin has been flown into the through-hole 58. The valve body 60 is constituted by the throttle shaft 20 and the valve member 4 (see FIGS. 7 and 8).

The valve member 4 corresponds to the "valve part" in the present specification. The throttle shaft 20 corresponds to the "shaft part" in the present specification. While in this embodiment the valve body 60 is formed by integrating the throttle shaft 20 and the valve member 4, it is also possible to form the shaft part and the valve part as an integral unit by resin (e.g., integral molding), thus forming a resin valve body in the form of a single component.

Figure 7:
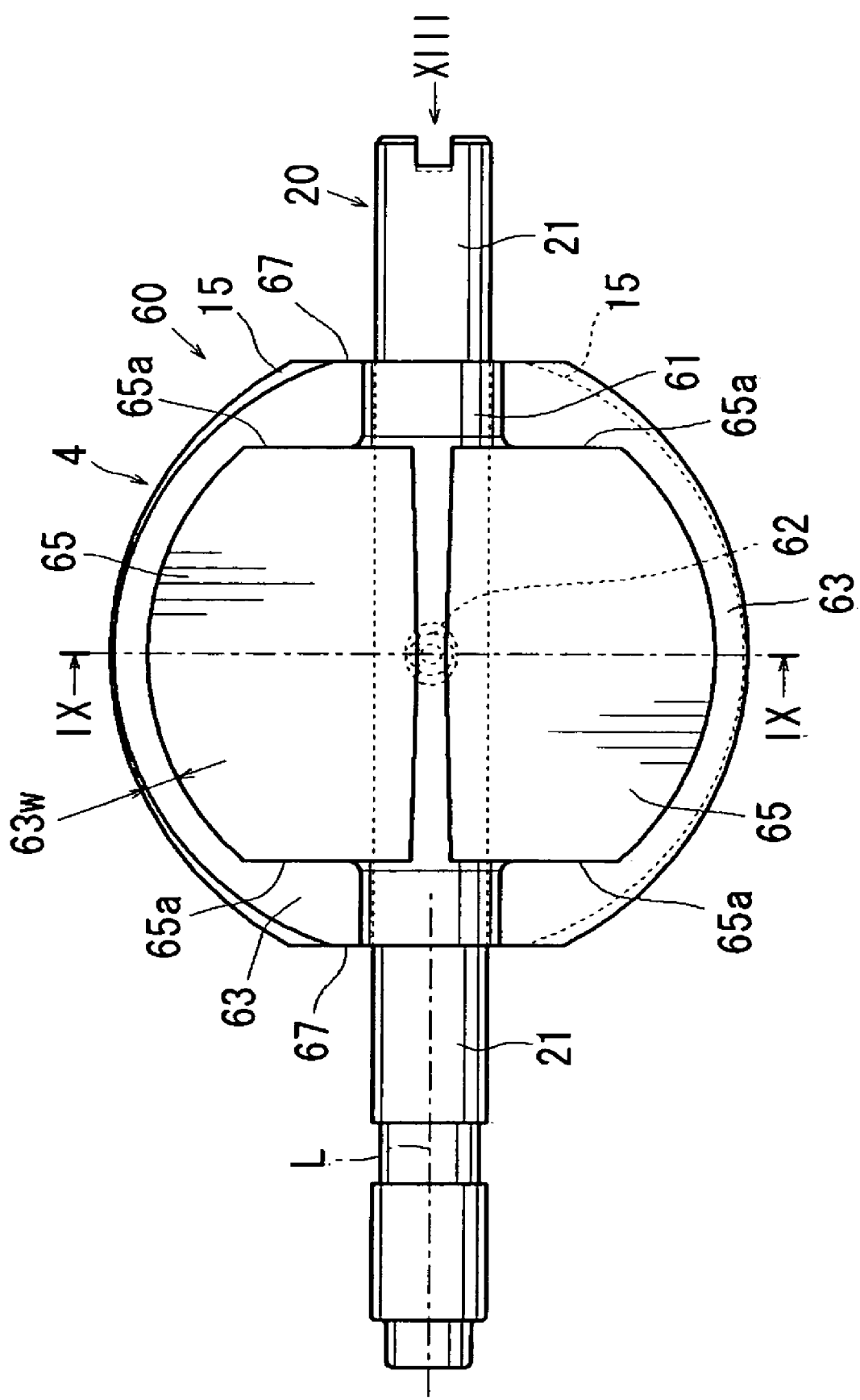
[FIG. 7] A front view of the valve body.

As shown in FIG. 7, the valve member 4 has a shaft cover portion 61, a bridging portion 62, plate-like portions 63, and rib portions 65. As shown in FIG. 9, the shaft cover portion 61 is formed in a substantially cylindrical configuration so as to surround the throttle shaft 20. The bridging portion 62 extends between opposing surfaces at the center of the shaft cover portion 61 so as to extend through the through-hole 58 of the throttle shaft 20. The plate-like portions 63 are formed of a pair of semi-circular portions and protrude in opposite directions from the shaft cover portion 61 so as to constitute a single disc (see FIGS. 7 and 8). The valve-side sealing surfaces 15 are formed at the outer peripheral end surfaces of the plate-like portions 63 (see FIGS. 8 and 9).

As shown in FIG. 8, the valve-side sealing surfaces 15 of the plate-like portions 63 are formed in point symmetry with respect to the axis L, and are formed as tapered surfaces whose outer diameter gradually increases from the closed side (see the direction of arrow S) toward the open side (see the direction of arrow O) with respect to the thickness direction. Further, the valve-side sealing surfaces 15 are formed at the time of molding the valve member 4, and are in surface-to-surface contact with the body-side sealing surface 16 of the main body 3. As stated above, on the bore wall surface 13 of the primary tubular portion 10 of the main body 3, the body-side sealing surface 16 is formed and is in surface-to-surface contact with the valve-side sealing surfaces 15 of the valve member 4 (see FIGS. 8 and 9). In this embodiment, the sealing surface 16 of the main body 3 is formed by the inner peripheral end surface of a convex ridge portion 126 protruding in a flange-like fashion from the bore wall surface 13 of the primary tubular portion 10 of the main body 3 (see FIGS. 8 and 9).

As shown in FIGS. 8 and 9, the rib portions 65 expands from the front and back surfaces of the plate-like portions 63 while being continuous with the shaft cover portion 61. The ridges of the rib portions 65 extend tangentially from a position proximally to the free end portions of the plate-like portions 63 with respect to the outer peripheral surface of the shaft cover portion 61.

As shown in FIG. 7, the free end portions of the plate-like portions 63 of the valve member 4 are formed as arcs having a predetermined width 63w.

A lateral end face 65a defining a plane orthogonal to the rotational axis L of the throttle shaft 20 is formed on each rib portion 65. Both axial end portions of the shaft cover portion 61 are thereby exposed beyond the lateral end faces 65a of the rib portions 65. Further, both lateral end faces 65a of the rib portions 65 function as a pair of positioning reference planes 65a (indicated by the same reference numeral 65a as the lateral end faces) for axial positioning of the valve body 60 with respect to a body molding die 90 (described below).

Further, in the front surface and/or the back surface of the shaft cover portion 61 of the valve member 4 (which, in this embodiment, is the downstream side (left-side) surface in FIG. 9), a positioning hole 66 is formed as a bottomed hole situated coaxially with the through-hole 58 of the throttle shaft 20. The positioning hole 66 functions as positioning means when setting the valve body 60 with respect to the body molding die 90 (described below).

The right and left sides and the front and back sides of the valve member 4 are formed symmetrically except for the valve-side sealing surfaces 15 (see FIGS. 7 through 9).

Next, a method of manufacturing the above-mentioned throttle body 2 will be described. The method of manufacturing the throttle body 2 is a method of molding the main body 3 with the valve body 60 inserted, and includes a process for molding the valve body 60 and a process for molding the main body 3.

In the process for molding the valve body 60, the valve member 4 is molded by a resin injection molding process using a valve molding die (mold). In this process, the throttle shaft 20 is inserted into the valve molding die, and then resin is injected into a mold space, that is, so-called cavity in conformity with the configuration of the valve member 4, so that the valve 60 is molded with the valve member 4 integrated with the throttle shaft 20 (see FIGS. 7 through 9). Since the valve molding die used in this process is of a well-known construction, a description thereof will be omitted.

Figure 6:
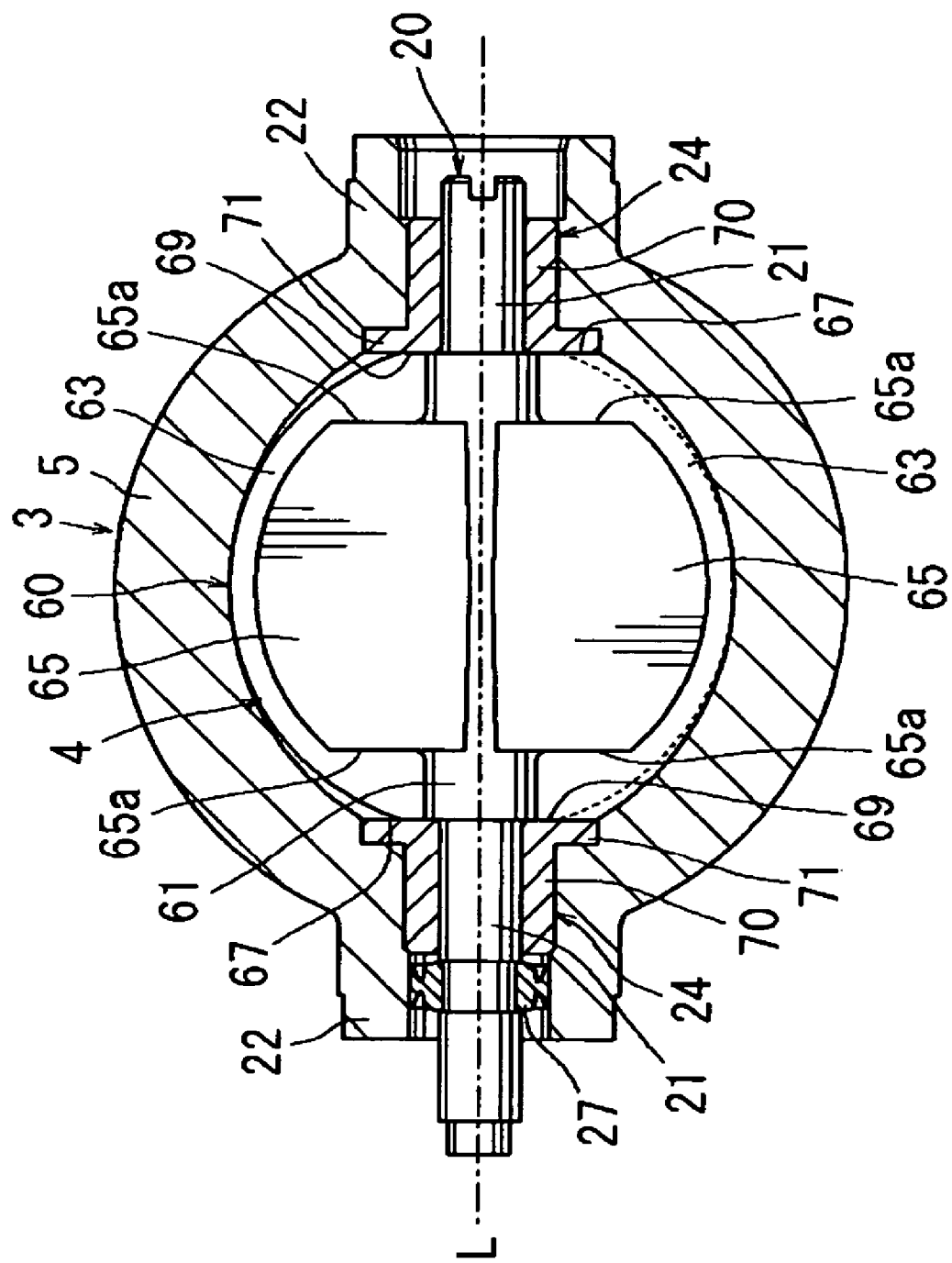
[FIG. 6] A sectional view showing the relationship between the valve body and the main body.

Next, in the process for molding the main body 3, the main body 3 is molded by a resin injection molding process using a body molding die (mold). In this process, the valve body 60 molded in the previous process, the bearing sleeves 24, etc. are inserted, and then resin is injected into a mold space, that is, so-called cavity corresponding to the configuration of the main body 3, so that the main body 3 is molded with the valve body 60 assembled (see FIG. 6). Further, the resin is filled along the valve-side sealing surfaces 15 of the valve member 4, so that the body-side sealing surface 16 in conformity with the valve-side sealing surfaces 15 is formed in the main body 3 (see FIGS. 8 and 9). The body molding die used in this process will be described below.

The sealing material 27, the back spring 32, the drive motor 33, the reduction gear mechanism 45, the cover body 40, etc. are assembled to the throttle body 2 molded by the manufacturing process described above, so that the throttle body 2 is completed (see FIG. 3).

As the resin material of the main body 3 and the valve member 4 described above, it is possible to use a composite material using a synthetic resin as the base material (matrix). Examples of the synthetic resin base material that can be adopted include polyester type resins such as polyethylene terephthalate and polybutylene terephthalate, polyolefin type resins such as polyethylene and polypropylene, polyamide type resins such as polyamide 6, polyamide 66, and aromatic polyamide, general-purpose resins such as ABS, polycarbonate, and polyacetal, super engineering plastics such as a polyacetal resin, polyphenylene sulfide, polyether sulfone, polyetherether ketone, polyether nitrile, and polyether imide, thermosetting resins such as a phenol resin, an epoxy resin, and an unsaturated polyester resin, and synthetic resins such as a silicone resin and a teflon (registered trademark) resin.

The above-mentioned composite material includes a fibrous material and a filler material. Examples of such materials that can be adopted include fibers such as glass fiber, carbon fiber, ceramics fiber, cellulose fiber, vinylon fiber, brass fiber, and aramide fiber, calcium carbonate, zinc oxide, titanium oxide, alumina, silica, magnesium hydroxide, talc, calcium silicate, mica, glass, carbon, graphite, thermosetting resin powder, and cashew dust. In some cases, it is possible to mix flame retardant, ultraviolet inhibitor, antioxidant, lubricant, etc. with the composite material In the case of the throttle body 2, the moving amount in the thrust direction (right and left directions in FIG. 6) of the valve member 4 is regulated by sliding contact of the opposing end faces of the valve member 4 of the valve body 60 and the bearing sleeves 24. The end faces 67 of the valve member 4 (see FIG. 7) opposed to the end faces 69 of the bearing sleeves 24 (see FIG. 7) will be referred to as "the slide faces of the valve member 4, the valve-side slide faces", etc. The end faces 69 of the bearing sleeve 24 will be referred to as "slide faces of the bearing sleeves 24, the bearing-side slide faces 69", etc. The valve-side slide faces 67 and the bearing-side slide faces 69 are defined by planes orthogonal to the rotational axis L of the throttle shaft 20. Between the valve-side slide faces 67 and the bearing-side slide faces 69, predetermined gaps, so-called clearances are ensured for improving the operability regarding the opening/closing of the valve body 60. In this specification, "the clearances between the valve-side slide faces 67 and the bearing-side slide faces 69" are the clearances between the slide faces 67 and 69 in the state where the valve member 4 is positioned within the bore 7 coaxially therewith.

Each bearing sleeve 24 has a cylindrical tubular body 70, and a flange portion 71 extending in an annular configuration on the outer periphery of the valve-side end portion of the tubular body 70. Each bearing sleeve 24 is constituted by a dry bearing made of material having a good sliding property. The bearing sleeves 24 correspond to "bearings" in this specification and may be replaced by roller bearings.

The outer periphery of each bearing sleeve 24 including the flange portion 71 is surrounded by the bearing boss portion 22 of the main body 3.

In addition, the sliding face 69 of each bearing sleeve 24 is formed by the end surface of the tubular body 70 including the flange portion 71.

Figure 10:
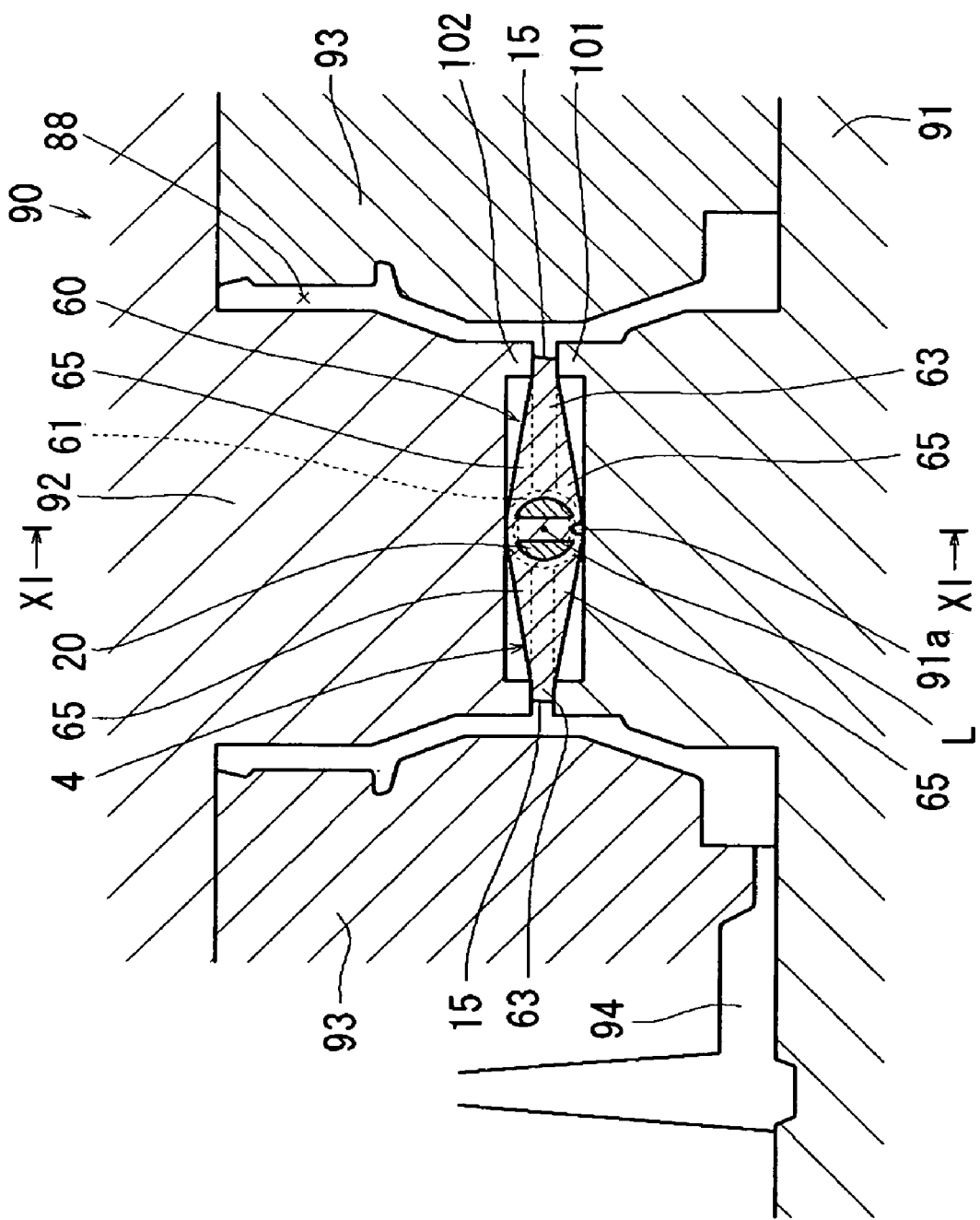
[FIG. 10] A side sectional view of a body molding die.

Further, the sliding faces 67 of the valve member 4 slidably contact entirely with the sliding faces 69 of the bearing sleeves 24, Next, the body molding die for molding the main body 3, with the valve body 60 (see FIGS. 7 through 9) inserted together with the pair of bearing sleeves 24, will be described. In the case of this embodiment, a body molding die 90 (see FIGS. 10 and 11) is used to mold the main body 3 (see FIG. 4), with the valve member 4 of the valve body 60 set in the fully closed state and with the inlet-side tubular connecting portion 8 of the main body 3 directed upwards and the outlet-side tubular connecting portion 12 thereof directed downwards. FIG. 10 is a side sectional view of the body molding die, and FIG. 11 is a sectional view taken along the arrow line XI-XI of FIG. 10.

Figure 11:
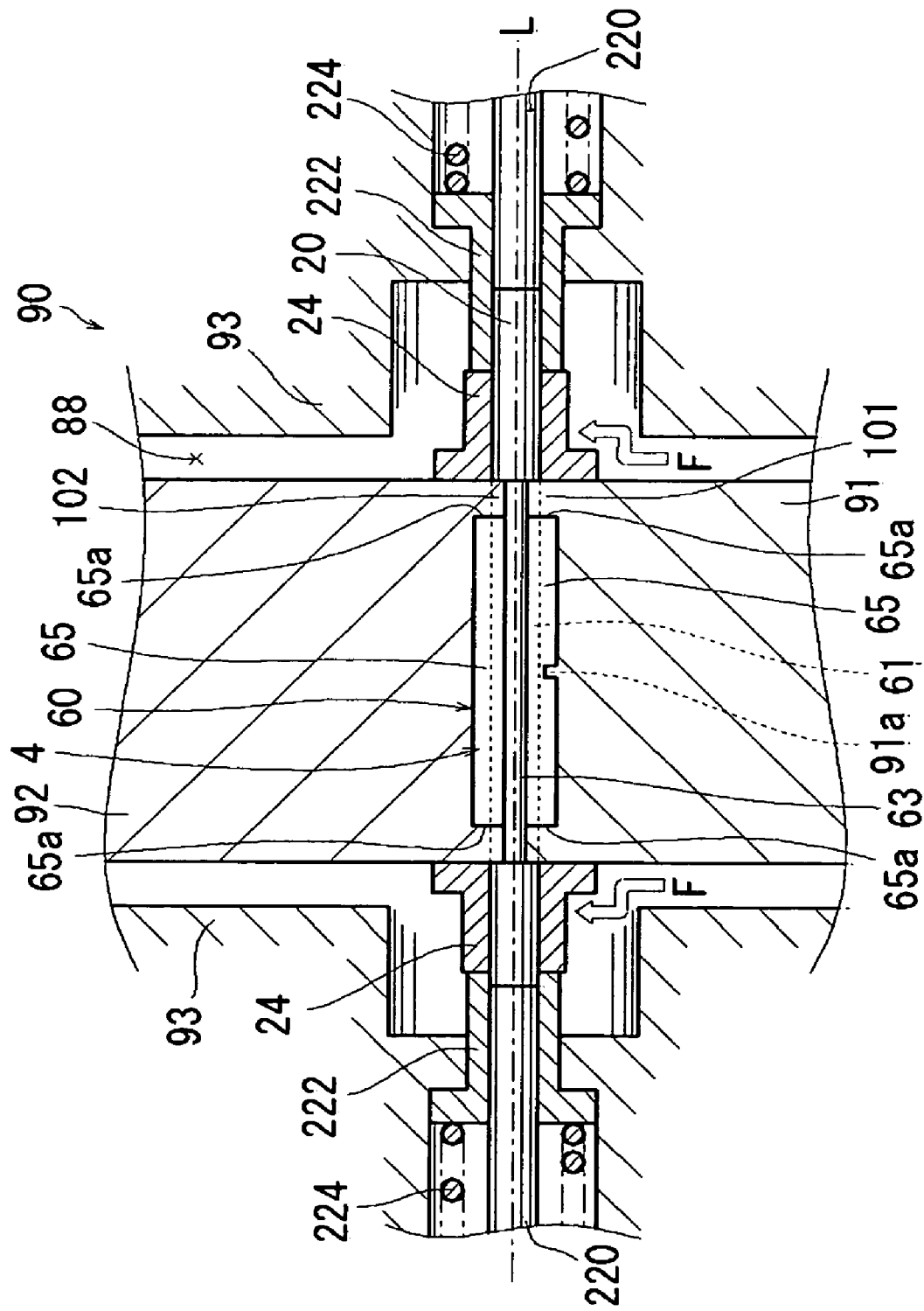
[FIG. 11] A sectional view taken along the arrow line XI-XI in FIG. 10.

As shown in FIG. 11, the body molding die 90 molds the main body 3, with the valve body 60 and the pair of right and left bearing sleeves 24 inserted. The body molding die 90 is equipped with a lower die 91 which is a stationary die defining a cavity 88 corresponding to the main body 3, an upper die 92 which is a movable die capable of moving vertically, and a plurality of (four in total including those on the front, rear, right and left sides in this embodiment) lateral dies 93 which are movable dies capable of laterally moving.

In the case of this embodiment, the free ends of the plate-like portions 63 of the valve member 4 (see FIG. 7) and opposite end portions of the shaft cover portion 61 are held between a straight tubular portion 101 provided at the lower end surface of the lower die 91 and a straight tubular portion 102 provided at the upper end surface of the upper die 92 (see FIGS. 10 and 11). The central portion including the rib portions 65 of the valve member 4 is accommodated in the straight tubular portion 101 of the lower die 91 and the straight tubular portion 102 of the upper die 92. Further, a flange-like space portion constituting a part of the cavity 88 and facing the sealing surfaces 15 of the valve member 4 (see FIG. 10) is defined between the outer peripheral portions of the straight tubular portion 101 of the lower die 91 and the straight tubular portion 102 of the upper die 92.

As shown in FIG. 11, the inner side surfaces of the straight tubular portion 101 of the lower die 91 and the straight tubular portion 102 of the upper die 92 are respectively formed so as to be capable of coming into surface-to-surface contact with the positioning reference planes 65a of the rib portions 65 on the front and back surfaces of the valve member 4. The positioning reference planes 65a of the rib portions 65 of the valve member 4 are respectively brought into surface-to-surface contact with the inner side surfaces of the straight tubular portions 101 and 102, so that the valve member 4 of the valve body 60 is positioned with respect to the axial direction (right and left directions in FIG. 11).

The outer side surfaces of straight tubular portion 101 of the lower die 91 and the straight tubular portion 102 of the upper die 92 are formed so as to be capable of being respectively brought into surface-to-surface contact with the end faces 69 of the bearing sleeves 24. The end faces 69 of the bearing sleeves 24 respectively come into contact with the outer side surfaces of the straight tubular portions 101 and 102, so that the bearing sleeves 24 are positioned with respect to the axial direction (right and left directions in FIG. 11).

A positioning projection 91a protrudes from the upper surface of the lower die 91. When the valve member 4 of the valve body 60 is set on the lower die 91, the positioning hole 66 (see FIG. 9) of the valve member 4 is fitted with the positioning projection 91a, so that the valve member 4 of the valve body 60 is positioned at a predetermined set position. The positioning of the valve body 60 by the positioning projection 91a and the positioning hole 66 is primarily aimed to position the throttle shaft 20 with respect to the radial direction (right and left directions in FIG. 10).

As shown in FIG. 11, shaft presser pins 220 are respectively axially (right and left directions in FIG. 11) movably disposed in the right-side and left-side lateral dies 93. On the rotational axis L of the throttle shaft 20, the shaft presser pins 220 are forced in opposite directions by the resilient force of presser pin spring members that are not shown. The opposing end surfaces of the shaft presser pins 220 can abut the end surfaces of the throttle shaft 20, with the throttle shaft 20 being resiliently retained by the shaft presser pins 220. Since the positioning of the valve body 60 is effected between the lower die 91 and the upper die 92, it is also possible to eliminate the shaft presser pins 220.

In the right-side and left-side lateral dies 93, cylindrical bearing presser bushes 222 are respectively disposed so as to be axially movable on the shaft presser pins 220. On the shaft presser pins 220, the bearing presser bushes 222 are forced in opposite directions by the resilient force of bush presser spring members 224 formed of coil springs or the like. The opposing end surfaces of the bearing presser bushes 222 can abut the outer end surfaces (surfaces on the side opposite to the sliding side), and the bearing sleeves 24 are resiliently brought into contact, by the bearing presser bushes 222, with the outer side surfaces of the straight tubular potion 101 of the lower die 91 and the straight tubular portion 102 of the upper die 92. The bush presser spring members 224 produce such spring forces that allow the bearing sleeves 24 to move in the radial direction or upward in FIG. 11 by distances corresponding to the clearances between the shaft support portions 21 and the bearing sleeves 24 when the resin molding pressure F of the main body 3 has been applied to the bearing sleeves 24.

As shown in FIG. 10, a pouring gate or a resin injecting gate 94 communicating with the cavity 88 from the lateral side thereof is provided between the lower die 91 and the lateral die (e.g., front lateral die) 93. The resin injecting gate 94 communicates with the lower end portion of the cavity 88 in a position substantially directly below a line orthogonal to the rotational axis L of the throttle shaft 20 and extending in front and forward directions (right and left directions in FIG. 10). As a result, resin (molten resin) injected into the cavity 88 via the resin injecting gate 94 flows upwards within the cavity 88 and can lift the bearing sleeves 24 respectively by substantially the same resin molding pressure F. The resin injecting gate 94 may be provided at one position substantially below the front or rear side position of the line orthogonal to the rotational axis L of the throttle shaft 20 and extending in front and forward directions (right and left directions in FIG. 10). Alternatively, two resin injecting gates 94 may be provided symmetrically with each other with respect to front and rear directions as viewed in FIG. 10.

The case of molding the main body 3 by the body molding die 90 will be described. As shown in FIG. 11, the valve body 60 is inserted into the body molding die 90 with the valve member 4 fully closed, and the bearing sleeves 24 are fitted onto the support shaft portions 21 of the throttle shaft 20.

More specifically, the free end of the plate-like portion 63 of the valve member 4 (see FIG. 7) and the end portions of the shaft cover portion 61 are placed on the straight tubular portion 101 of the lower die 91, and the central portion including the rib portion 65 on the back surface side (lower surface side) of the valve member 4 is accommodated in the straight tubular potion 101. At the same time, the positioning reference planes 65a of the rib portions 65 on the back surface side (lower surface side) of the valve member 4 are brought into surface-to-surface contact with the inner side surface of the straight tubular portion 101 of the lower die 91, so that the valve body 60 is positioned with respect to the axial direction (right and left directions in FIG. 11). Further, the positioning hole 66 (see FIG. 9) in the back surface side (lower surface side) of the valve member 4 is fitted with the positioning projection 91a protruding from the central portion of the upper surface of the lower die 91, so that the valve body 60 is positioned at a predetermined set position.

In this state, after fitting the bearing sleeves 24 onto the support shaft portions 21 of the throttle shaft 20, the dies 92, 93, and 95 of the body molding die 90 are closed except for the lower die 91 (see FIGS. 10 and 11). Then, the straight tubular portion 102 of the upper die 92 presses the free end portion of the plate-like portion 63 on the front surface side (upper surface side) of the valve member 4 and the end portions of the shaft cover portion 61, against the straight tubular portion 101 of the lower die 91. At the same time, the central portion including the rib portion 65 on the front surface side (front surface side) of the valve member 4 is accommodated in the straight tubular portion 102 of the upper die 92. At the same time, the positioning reference planes 65a of the rib portions 65 on the front surface side (upper surface side) of the valve member 4 are brought into surface-to-surface contact with the inner side surface of the straight tubular portion 102 of the upper die 92, so that the valve member 4 of the valve body 60 is positioned with respect to the axial direction (right and left directions in FIG. 11). Further, between the shaft presser pins 220 arranged in the lateral dies 93, the throttle shaft 20 is resiliently retained by the resilient force of the presser pin spring members which are not shown (see FIG. 11). Further, the bearing presser bushes 222 arranged in the lateral dies 93 press the bearing sleeves 24 against the outer side surfaces of the straight tubular portion 101 of the lower die 91 and the straight tubular portion 102 of the upper die 92 by the resilient force of the bush presser spring members 224 and retain them in this state (see FIG. 11). In this way, the bearing sleeves 24 are positioned at predetermined positions in the axial position.

Subsequently, resin (more specifically, molten resin) is injected via the resin injecting gate 94 (see FIG. 10) into the cavity 88 defined by the body molding die 90 in order to mold the main body 3. During this process, the resin injected into the cavity 88 via the resin injecting gate 94 is filled within the cavity 88 toward upward from the bottom. As the resin reaches to the bearing sleeves 24, the resin lifts the bearing sleeves 24 in the direction opposite to the flow of the intake air or upward in FIG. 11 by the resin molding pressure F (see FIG. 11) and forces the inner peripheral surfaces of the bearing sleeves 24 to contact with the shaft support portions 21 of the throttle shaft 20. In this way, the resin is injected into the cavity and is filled therein.

After completion of curing of the main body 3, the dies 91, 92, 93, and 95 are opened, and the molding, that is, the throttle body 2 (see FIG. 10) is extracted.

Figure 12:
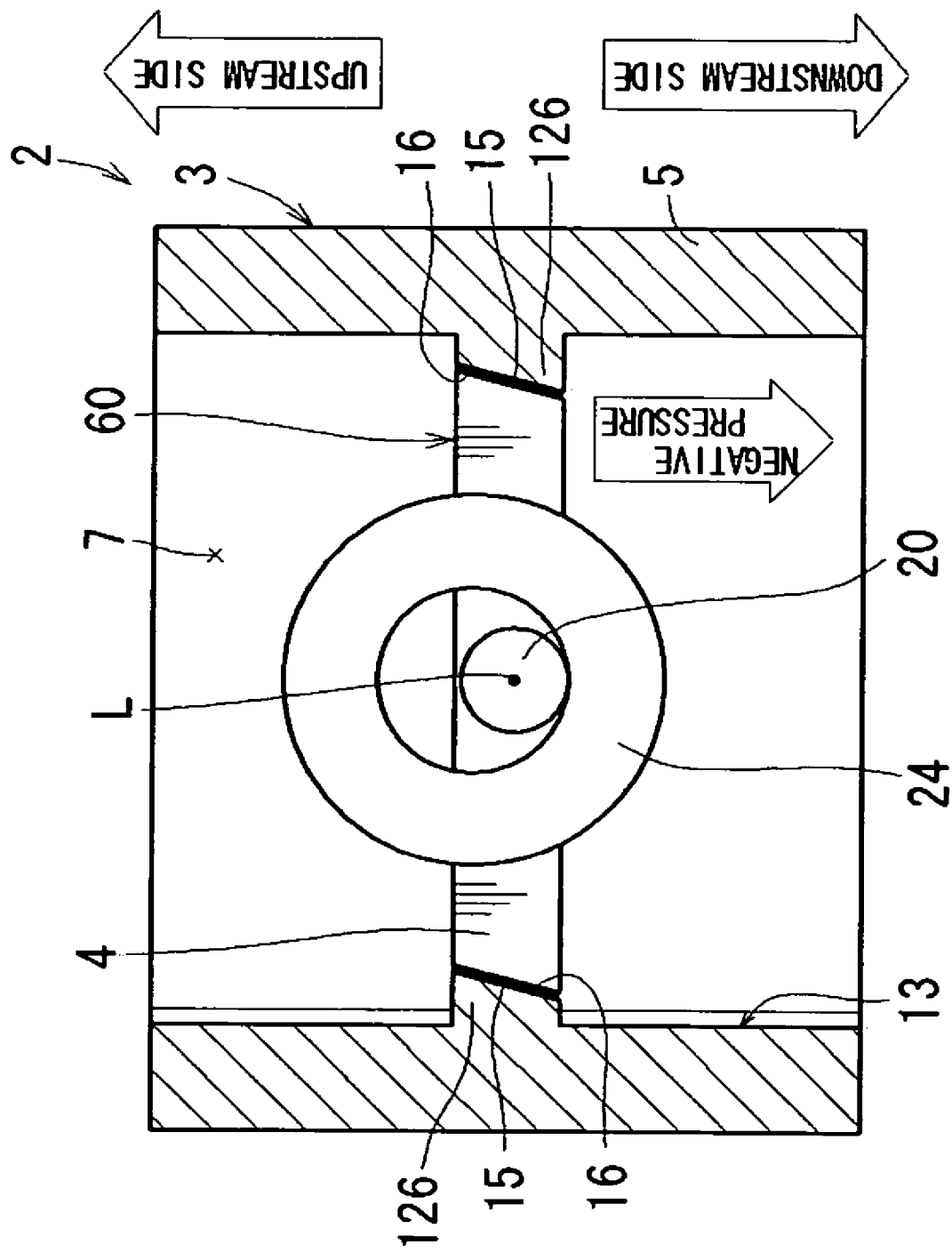
[FIG. 12] An explanatory view showing the relationship between the valve body and bearing sleeves.

According to the method of manufacturing the throttle body 2 described above, the main body 3 is molded while the bearing sleeves 24 contacting with the throttle shaft 20 in the direction opposite to the flow of the intake air. Therefore, the bearing sleeves 24 are integrated with the main body 3, while they are accurately positioned in the direction opposite to the flow of the intake air (upward in FIG. 11) by reference to the throttle shaft 20. Therefore, even if the negative pressure of the intake air has been applied to the valve body 60 (in particular valve member 4) at the actual use state of the throttle body as shown in FIG. 12, the throttle shaft 20 can be held in place by the bearing sleeves 24, so that it is possible to preclude the shift of the valve body 60 toward the negative pressure side or the downstream side (lower side in FIG. 12). As a result, it is possible to attain the state where the sealing surfaces 16 of the valve member 4 properly closely contact with the valve-side sealing surfaces 16 of the main body 3 when the valve body 60 is in the fully close position. Therefore, it is possible to improve the sealing property of the valve body 60 at the fully closed position against the bore 7 of the main body 3 and to reduce the air leak amount at the fully closed position of the valve body 60.

Further, since the bearing sleeves 24 are biased in the direction opposite to the flow of the intake air by using the resin molding pressure F (see FIG. 11) at the time of molding the main body 3, it is possible to eliminate a special means for biasing the bearing sleeves 24.

Furthermore, with the throttle body 2 described above, it is possible to improve the sealing property of the valve body 60 at the fully closed position against the bore 7 of the main body 3 and to reduce the air leak amount at the fully closed position of the valve body 60.

Embodiment 2

Figure 13:
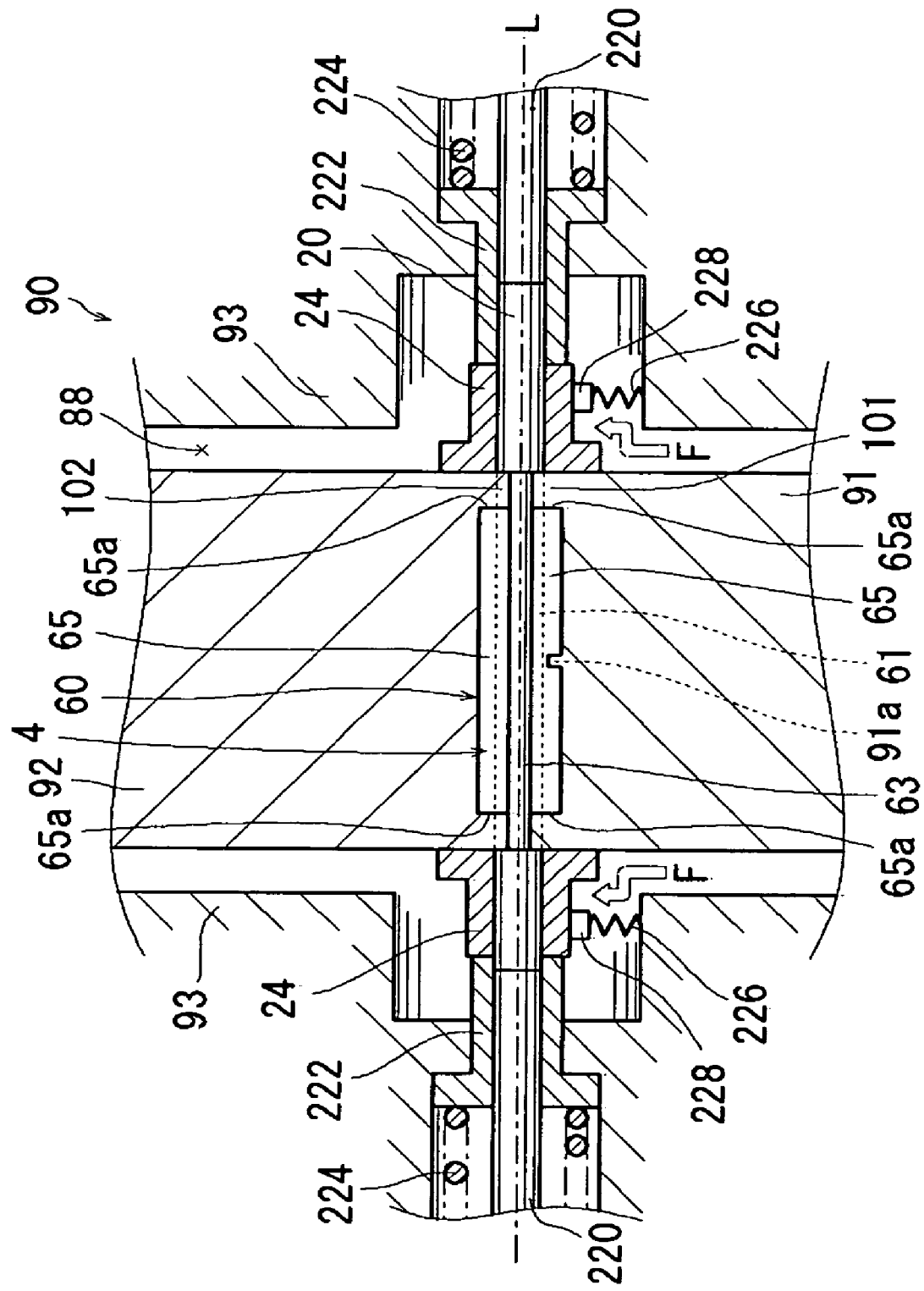
[FIG. 13] A sectional view showing a body molding die according to Embodiment 2.
Figure 14:
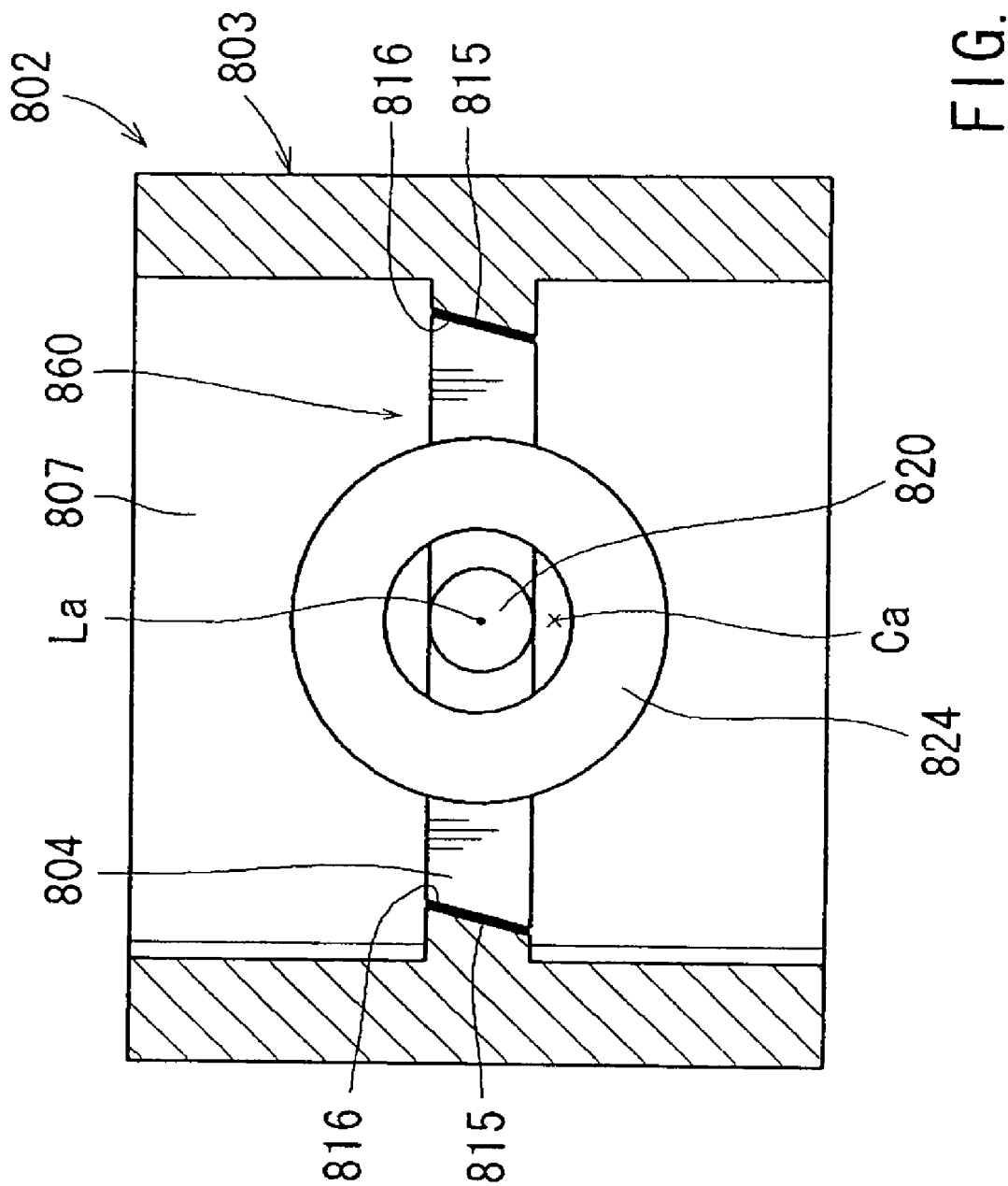
[FIG. 14] An explanatory view showing the relationship between a valve member and bearing sleeves during a molding process according to the prior art.
Figure 15:
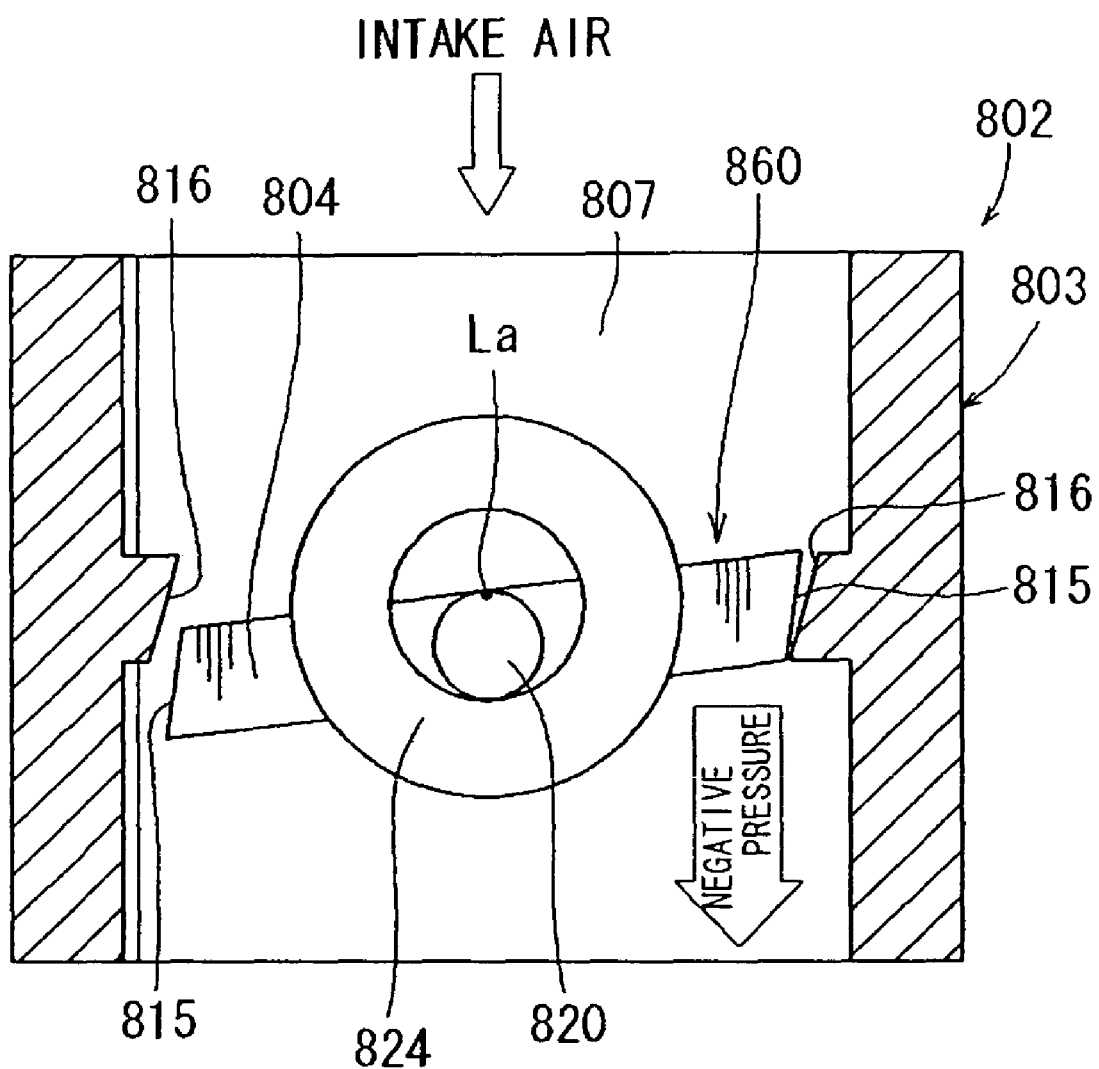
[FIG. 15] An explanatory view showing the relationship between the valve body and the bearing sleeves in the state where a negative pressure has been applied in an actual use state.

Embodiment 2 will be described. This embodiment is a modification of a part of Embodiment, and therefore, the description will made to the modified portions, and a redundant description will not be made. FIG. 13 is a sectional view showing a body molding die As shown in FIG. 13, in this embodiment, between the bearing sleeves 24 and the mold surfaces of the right and left lateral dies opposing the lower surfaces of the bearing sleeves 24 in the body molding die 90 of Embodiment 1, bearing presser pins 228 and bearing-presser spring members 226 are provided. The spring members 226 respectively have spring forces that bias the bearing sleeves 24 upward. With this arrangement, the main body 3 is molded with the bearing sleeves 24 biased in the direction opposite to the flow of the intake air or upward in FIG. 13. In this case, it is possible to bias the bearing sleeves 24 in the direction opposite to the flow of the intake air by using the resin molding pressure F for the main body 3 and the spring forces of the bearing-presser spring members 226. In this embodiment, the bearing-presser spring members 226 and the bearing presser pins 228 are integrated with the main body 3.

Also with the method of manufacturing the throttle body 2 and with the throttle body manufactured by this manufacturing method, it is possible to attain the operations and effects equivalent to those of Embodiment 1.

In addition, it is possible to suitably bias the bearing sleeves in the direction opposite to the flow of the intake air by using the spring forces of the bearing-presser spring members 226. Therefore, even in the event that the resin molding pressure F for the main body 3 (see FIG. 11) biases the bearing sleeves 24 in the different direction from the direction opposite to the flow of the intake air, it is possible to suitably bias the bearing sleeves 24 in the direction opposite to the flow of the intake air against the resin molding pressure F.

The present invention is not restricted to the above-mentioned embodiments, and modifications are possible without departing from the gist of the present invention.

The invention claimed is:

1. A method of manufacturing a throttle body comprising a resin main body defining a bore through which intake air flows, and a valve body having a shaft part rotatably supported by the main body via a pair of bearings, and a valve part for opening and closing the bore of the main body;
   the method comprising molding the main body with the valve body inserted together with the pair of the bearings;
   wherein, with the valve body positioned in place, the bearings are biased in a direction opposite to the flow of the intake air;
   wherein a resin molding pressure for molding the main body is used as biasing force for biasing the bearings in the direction opposite to the flow of the intake air, and
   wherein a clearance is provided between each of the bearings and the shaft part, the clearance allowing each of the bearings to move relative to the shaft part in a direction substantially perpendicular to an axial direction of the shaft part before the main body is molded.

2. A method of manufacturing the throttle body according to claim 1, further comprising the step of integrating the valve part and the shaft part with each other before molding the main body.

3. A method of manufacturing the throttle body according to claim 2, wherein the valve part is made of resin and is molded integrally with the shaft part.

4. A method of manufacturing a throttle body, comprising the steps of:
   providing a valve body having a valve part and a shaft part integrated with each other;
   inserting the valve body together with a pair of bearings into a cavity of a molding die for molding a main body of the throttle body, the bearings being fitted onto the shaft part of the valve body;
   positioning the bearings and the shaft part within the cavity;
   injecting a resin into the cavity, so that the main body is molded integrally with the bearings;
   wherein the molded main body defines a bore for the flow of an intake air, and the shaft part extends across the bore;
   applying force to the bearings to press the bearings against the shaft part in a pressing direction substantially perpendicular to an axis of the shaft part during the step of injecting the resin,
   wherein the pressing direction is opposite to the direction of flow of the intake air within the bore of the main body and molding pressure of the injected resin is used as the force to press the bearings against the shaft part, and
   wherein a clearance is provided between each of the bearings and the shaft part, the clearance allowing each of the bearings to move relative to the shaft part in a direction substantially perpendicular to an axial direction of the shaft part before the main body is molded; and
   removing the molded main body together with the valve member and the bearings from the molding die.

5. A method of manufacturing the throttle body according to claim 4, wherein the valve part is made of resin and is molded integrally with the shaft part by an injection molding process.

* * * * *